C. M. FAHNESTOCK.
TRUCK.
APPLICATION FILED NOV. 19, 1913.
1,115,796.
Patented Nov. 3, 1914.
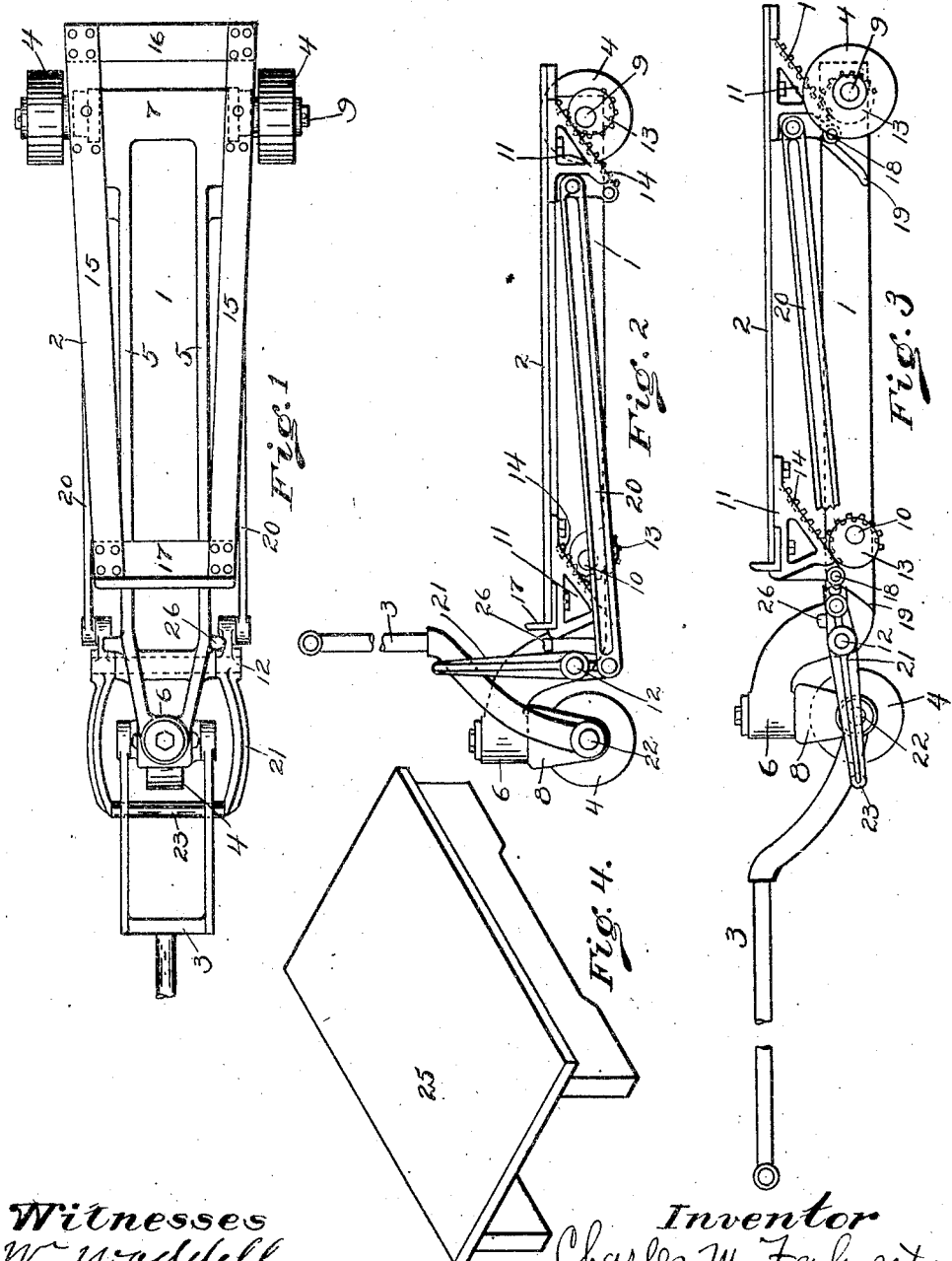

UNITED STATES PATENT OFFICE.

CHARLES M. FAHNESTOCK, OF CINCINNATI, OHIO.

TRUCK.

1,115,796.  Specification of Letters Patent.  Patented Nov. 3, 1914.

Application filed November 19, 1913. Serial No. 801,866.

*To all whom it may concern:*

Be it known that I, CHARLES M. FAHNESTOCK, a citizen of the United States, residing at the city of Cincinnati, in the county of Hamilton and State of Ohio, have invented certain new and useful Improvements in Trucks, of which the following is a specification.

My invention belongs to that class of trucks, in which mechanical movements, or powerful mechanical devices are employed, to assist in lifting the load to be carried; thus facilitating the loading or unloading of the truck; and in connection with which a supplementary stand or platform, upon which the goods or articles to be trucked, have previously been loaded, or placed in the regular course of manufacture.

The object of my invention is to produce such a truck, which shall be very simple in construction, cheap of manufacture and highly efficient in use.

Its various features and advantages will readily become apparent from a perusal of the following specification and claim.

In the accompanying drawing forming part of this specification; Figure (1) is a plan view of my new truck, with the platform raised, Fig. (2) is a side elevation of the truck, the platform being lowered, Fig. (3) is a side elevation of the truck, with the platform raised, and Fig. (4) is an isometric view of one of the supplemental platforms used in connection with the truck.

The truck proper consists of a frame (1), a platform (2), a handle lever (3), wheels (4), and intermediate and connecting parts.

The frame (1) is preferably a casting composed of sides 5—5, converging toward the front to form a bearing (6), and at the rear connected by the end (7). The bearing (6) is adapted to carry the fork (8), which in turn carries the front wheel (4). At the back the frame (1) is adapted to receive the axle or shaft (9), which supports the rear wheels 4—4. At the front, the frame (1) also carries the shafts (10) and (12).

On the shafts (9) and (10), on each side of said frame (1), are mounted cam gears (13). Bearing on these cam gears (13), and provided with racks (14) adapted to mesh therewith, I provide inclines (11), which support the platform (2), to which they are rigidly attached at both ends of the platform.

The platform (2) is formed of side pieces (15), rear end piece (16) and front end angle (17). The platform (2) is kept in meshing contact with the cam gears (13) through the agency of pins (18) on incline racks (14) bearing against rib (19) on the frame (1), (see Fig. 3).

To the rear incline (14), on each side of the platform (2) is connected one end of a link (20), which at its forward end is secured to a yoke (21), which yoke is pivoted on shaft (12). The yoke (21) is peculiarly formed so as that it will pass over the front wheel (4), permitting the free motion or play of the wheel and its connecting parts (see particularly Fig. 1) in order that the truck may be guided when the platform (2) is in raised position.

A lever handle (3) pivotally secured to front axle (22), is forked at its lower end to straddle the front wheel, and connects to the ends of the axle (22) at each side; the fork of the handle (3) being so shaped that it will bear against part (23) of the yoke (21).

The frame, platform, wheels, inclines, racks, handle, yoke and connecting parts may be made of any suitable material and be of any desired shape and contour.

The truck operates as follows, to wit: Any number of the supplementary platforms (25) may be used, and on these platforms are loaded the articles or goods to be trucked; the truck, in a lowered position (see Fig. 2), is backed under one of the loaded supplementary platforms (25); the lever handle (3) is then pulled down, which, bearing against part (23) of yoke (21) brings the said yoke into a horizontal position, as shown in Figs. (1) and (3), which operation pushes the links (20), and consequently the upper platform (2) backward and in consequence of the cam gears (13) and inclined racks (14), upward, lifting the supplementary platform and load free of the floor, allowing it to be moved. The yoke (21) is brought into such position that it will bear against the lug (26) on the frame (1), making the center of pressure above the line of the shaft (12), thus preventing the yoke (21) from returning to normal position, except by the raising of the yoke (21) by an outside power, which will allow platform (2) to be lowered.

It will readily become apparent, that my truck is unique and powerful, and can be operated readily and easily with the least power possible, considering the load to be raised and trucked, and that it will not readily get out of order.

While I have described one specific form and construction of truck, it will be obvious that the truck is capable of being modified considerably without departing from the principle and spirit of the invention and I wish to be understood as not limiting myself to the specific construction shown and described, but such modifications will still fall within the scope of my invention.

What I claim as new and my invention, and desire to secure by Letters Patent is:

In a truck of the character described, a frame, a platform mounted on said frame, cam gears on said frame, inclined racks on the platform, said racks bearing on and engaging the cam gears, and means for operating the platform so that the racks will operatively engage the cam gears to elevate the platform.

In testimony whereof I affix my signature in presence of two witnesses.

CHARLES M. FAHNESTOCK.

Witnesses:
H. E. CARSTENS,
HENRY BAER.